(12) United States Patent
Tamasi et al.

(10) Patent No.: US 7,372,465 B1
(45) Date of Patent: May 13, 2008

(54) SCALABLE GRAPHICS PROCESSING FOR REMOTE DISPLAY

(75) Inventors: Anthony M. Tamasi, San Jose, CA (US); Philip B. Johnson, Campbell, CA (US); Franck R. Diard, Mountain View, CA (US); Brian M. Kelleher, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 405 days.

(21) Appl. No.: 11/016,586

(22) Filed: Dec. 17, 2004

(51) Int. Cl.
*G06F 15/16* (2006.01)

(52) U.S. Cl. .................. 345/502; 345/503; 345/504; 345/505

(58) Field of Classification Search ............ 345/505, 345/502, 503, 504
See application file for complete search history.

(56) References Cited

U.S. PATENT DOCUMENTS

| | | |
|---|---|---|
| 5,448,655 A | 9/1995 | Yamaguchi |
| 5,784,628 A | 7/1998 | Reneris |
| 5,794,016 A * | 8/1998 | Kelleher ............... 345/505 |
| 6,191,800 B1 | 2/2001 | Arenburg et al. |
| 6,329,996 B1 | 12/2001 | Bowen et al. |
| 6,473,086 B1 * | 10/2002 | Morein et al. ............ 345/505 |
| 6,501,999 B1 | 12/2002 | Cai |
| 6,535,939 B1 | 3/2003 | Arimilli et al. |
| 6,631,474 B1 | 10/2003 | Cai et al. |
| 6,683,614 B2 | 1/2004 | Walls et al. |
| 6,760,031 B1 | 7/2004 | Langendorf et al. |
| 6,919,896 B2 | 7/2005 | Sasaki et al. |
| 7,030,837 B1 | 4/2006 | Vong et al. |
| 7,176,847 B2 | 2/2007 | Loh |
| 2002/0047851 A1 | 4/2002 | Hirase et al. |
| 2002/0118201 A1 | 8/2002 | Mukherjee et al. |
| 2003/0128216 A1 | 7/2003 | Walls et al. |
| 2003/0137483 A1 | 7/2003 | Callway |
| 2004/0104913 A1 | 6/2004 | Walls et al. |
| 2005/0017980 A1 | 1/2005 | Chang et al. |
| 2005/0088445 A1 | 4/2005 | Gonzalez et al. |

(Continued)

FOREIGN PATENT DOCUMENTS

EP 0571969 A2 12/1993

(Continued)

OTHER PUBLICATIONS

Henry Fuchs, Distributing a visible surface algorithm over multiple processors, Proceedings of the 1977 annual conference, p. 449-451, Jan. 1977.*

(Continued)

*Primary Examiner*—Kimbinh T. Nguyen
(74) *Attorney, Agent, or Firm*—Patterson & Sheridan, LLP

(57) ABSTRACT

A system and method processes graphics data for remote display. A graphics processing system including a plurality of graphics processing devices is coupled to a host system that includes a host graphics processor and a display device that is remote relative to the graphics processing system. Graphics processing performance may be scaled by distributing processing between the plurality of graphics processing devices and the host graphics processor such that each of the plurality of graphics processing devices and the host graphics processor produces a portion of an image. The portions are combined to produce the image, which is output by the host graphics processor to the display device.

19 Claims, 7 Drawing Sheets

U.S. PATENT DOCUMENTS

| | | |
|---|---|---|
| 2005/0134588 A1 | 6/2005 | Aila et al. |
| 2005/0160212 A1 | 7/2005 | Caruk |
| 2005/0278559 A1 | 12/2005 | Sutardja et al. |

FOREIGN PATENT DOCUMENTS

| | | |
|---|---|---|
| FR | 2834097 A1 | 6/2003 |
| FR | 2839563 A1 | 11/2003 |
| JP | 5324583 A | 12/1993 |

OTHER PUBLICATIONS

Edward Brown, Andy Thorne, "FireWire Audio Applications utilizing high quality 96kHz 24bit I/O", Copyright Oxford Semiconductor 2004 © External—Free Release, Jul. 2004.*

"Alienware Announces Video Array and X2: An Exclusive Advancement in PC Graphics Technology", Alienware, May 12, 2004, <http://www.alienware.com/press_release_pages/press_release_template.aspx?FileName=press051204.asp>.

"Alienware Promises Fastest Graphics Solution", Alienware, Jun. 28, 2004, <http://www.alienware.com/press_release_pages/press_release_template.aspx?FileName=press062804.asp>.

"Frequently Asked Questions", Alienware, Oct. 22, 2004, <http://www.alienware.com/alx_pages/main_content.aspx>.

Whitman, Scott, "Dynamic Load Balancing for Parallel Polygon Rendering," IEEE Computer Graphics and Applications, IEEE Inc., New York, vol. 14, No. 4, Jul. 1, 1994.

Wasson, "NVIDIA's SLI resurrects DPU teaming Kickin' it old school-with 32 pipes", www.techreport.com, Jun. 28, 2004. pp. 1-3, http://techreport.com/etc/2004q2/nvdia-sli/.

Weinand, "NVIDIA lance le SLI: une technologie multi-GDU", www.erenumerigue.fr, Jun. 29, 2004. pp. 1-7 http://www.erenumerique.fr/nvidia_lance_le_sli_une_technologie_multi_gpu-art-655-7.html.

Marc Prieur, "NVIDIA GeForce 6600 GT—HardWare.fr," Sep. 7, 2004, retrieved from http://www.hardware.fr/art/imprimer/514. pp. 1-23.

English translation of: Marc Prieur, "NVIDIA GeForce 6600 GT—HardWare.fr," Sep. 7, 2004, retrieved from http://www.hardware.fr/art/imprimer/514. pp. 1-24.

Scott Wasson, "NVIDIA's SLI Resurrects GPU Teaming: Kickin' It Old School—With 32 Pipes", Jun. 28, 2004, retrieved from http://techreport.com/articles.x/6931. 5 pgs.

PCT Search Report. Oct. 12, 2007.

* cited by examiner

US 7,372,465 B1

SCALABLE GRAPHICS PROCESSING FOR REMOTE DISPLAY

BACKGROUND OF THE INVENTION

1. Field of the Invention

Embodiments of the present invention generally relate to computer graphics, and more particularly to processing graphics data for remote display.

2. Description of the Related Art

Conventional portable computing systems that include a graphics processor, such as laptop computers, are limited in graphics processing performance due to power constraints. In contrast, desktop computing systems are more flexible than portable computing systems in terms of power and configuration. However, graphics processing performance of desktop computing systems is limited by system configuration constraints, such as the number of graphics cards that may be installed in a particular desktop computing system and/or the number of graphics processors that may be driven by the host processor(s) available in the particular desktop computing system.

Accordingly, there is a need to be able to scale the graphics processing performance of a computing system by using additional graphics processing devices without being limited by power constraints or particular system configuration constraints.

SUMMARY OF THE INVENTION

The current invention involves new systems and methods for scalable processing of graphics data for remote display. A graphics processing system that includes a plurality of graphics processing devices is coupled to a host system including a host graphics processor and a display. The host system may be a portable computing system or a desktop computing system. The graphics processing system may be enclosed within a chassis designed to be coupled to a host system for supplementing the graphics processing performance of the host graphics processor. The graphics processing performance may be scaled by distributing a graphics processing workload between the plurality of graphics processing devices in the graphics processing system and the host graphics processor such that each such graphics processing device and the host graphics processor produce a different portion of an image. The portions are combined to produce the image, which is output by the host graphics processor to the remote (relative to the graphics processing system) display of the host system.

Various embodiments of the invention include a host system, a graphics processing system, and a first connection. The host system includes a host processor, a host display, and a host graphics processor coupled to the host display. The graphics processing system includes a first graphics processing device and a switch, wherein the switch is coupled to the first graphics processing device. The first connection is configured to directly couple the host graphics processor to the first graphics processing device for the transmission of pixel data.

Various embodiments of a method of the invention for processing graphics data for a host display include receiving the graphics data and graphics program instructions and processing the graphics data within a plurality of graphics processing devices. Each one of the plurality of graphics processing devices processes a portion of the graphics data to produce a portion of an image. Each portion of the image is successively combined to produce combined portions of the image that are output to a host graphics processor coupled to the host display.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Graphics processing performance of a portable computing system, such as a laptop computer, palm-sized computer, tablet computer, game console, cellular telephone, handheld device, or the like, may be increased by supplementing the processing capabilities of a host processor and host graphics processor of the portable computing system with a separate graphics processing system. Similarly, graphics processing performance of a desktop computing system may be increased without installing additional cards within the desktop chassis by supplementing the processing capabilities of a host processor and host graphics processor of the desktop computing system with a separate graphics processing system. Specifically, the processing of an image may be distributed between the host graphics processor and the separate graphics processing system, to leverage the host graphics processing and display resources. The host graphics processor outputs the processed image for display on the host display device. Connecting the separate graphics processing system to another display device is therefore unnecessary.

In some embodiments of the present invention, the graphics processing performance of the overall system may scale approximately linearly based on the number of graphics processing units (GPUs) to which a processing workload is distributed. In addition, a broadcast feature may be used so that transfers between the host processor and multiple GPUs do not scale linearly, but instead remain substantially the same as for the host system processing the workload alone. An example of this feature is described in U.S. patent application titled "BROADCAST APERTURE REMAPPING FOR MULTIPLE GRAPHICS ADAPTERS," Diard, et al, filed Dec. 15, 2004, and assigned to the assignee of the present invention describes the broadcast feature.

Figure 1A:
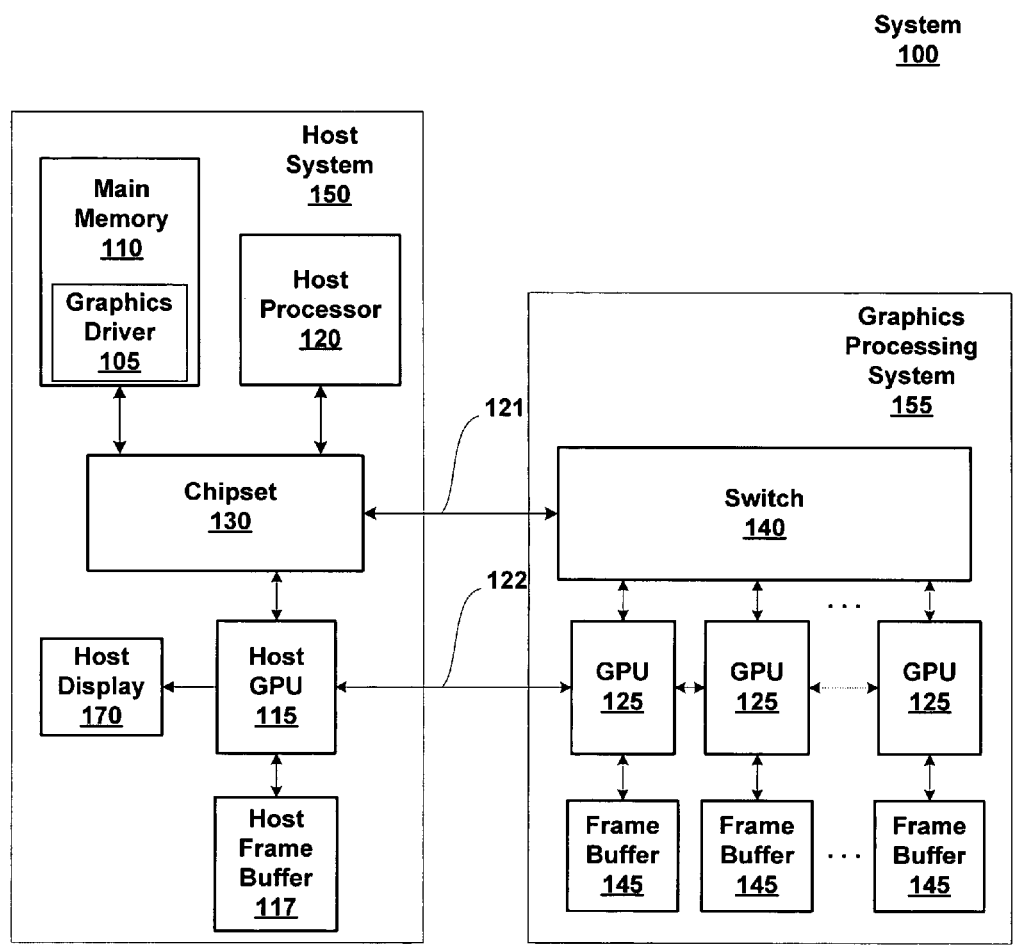
FIG. 1A is a block diagram of a scalable graphics processing system in accordance with one or more aspects of the present invention.

FIG. 1A is a block diagram of a scalable graphics processing system, system 100, including host system 150 and graphics processing system 155, in accordance with one or more aspects of the present invention. Host system 150 may be a desktop computer, server, laptop computer, palm-sized computer, tablet computer, game console, cellular telephone, hand-held device, computer based simulator, or the like. As shown, host system 150 includes, among other things, a host processor 120, a main memory 110, and a chipset 130. In some embodiments of the present invention, chipset 130 may include a system memory bridge and an input/output (I/O) bridge that may include several interfaces such as, Advanced Technology Attachment (ATA) bus, Universal Serial Bus (USB), Peripheral component interface (PCI), or the like. System 150 includes a connector that is accessible for installation of an electrically conductive device, such as a cable, to form connection 121, coupling chipset 130 to an external device, such as graphics processing system 155. In some embodiments of the present invention, host system 150 and graphics processing system 155 may be positioned several feet apart. System 100 also includes a graphics processing unit, Host GPU 115, which is directly coupled to a host display 170. Host display 170 may include one or more display devices, such as a cathode ray tube (CRT), flat panel display, or the like. Host GPU 115 is further coupled to a host frame buffer 117, which may be used to store graphics data, image data, and program instructions. In some embodiments of the present invention, host frame buffer 117 is omitted and host GPU 115 includes storage resources, e.g., random access memory (RAM), register files, or the like, configured to cache graphics data, image data, and program instructions.

As also shown in FIG. 1A, host GPU 115 is directly coupled to a first GPU 125 within graphics processing system 155 via a connection 122. Similar to connection 121, connection 122 may be formed by a cable. In one embodiment of the present invention, a single cable is used to form both connection 121 and connection 122. In other embodiments, separate connectors and cables may be used for connection 121 and connection 122. In addition, host GPU 115 is indirectly coupled to each GPU 125 via chipset 130, connection 121, and a switch 140 within graphics processing system 155. In some embodiments of the present invention, graphics processing system 155 is enclosed within a chassis that includes one or more connectors for connections 121 and 122 and a power supply. One or more graphics processing devices, such as an adapter card including a GPU 125 and a frame buffer 145, may be installed in graphics processing system 155. Therefore, graphics processing system 155 may be scaled by installing or removing graphics processing devices to achieve a desired graphics processing performance level.

Switch 140 provides an interface between chipset 130 and each GPU 125. A dedicated graphics interface is also provided between each GPU 125. The dedicated interface provides a point-to-point connection between each GPU 125 within graphics processing system 155 for transferring digital pixel data and synchronization signals between the GPUs 125. Furthermore, the dedicated interface provides a point-to-point connection between a first GPU 125 within graphics processing system 155 and host GPU 115, via connection 122, for transferring digital pixel data and synchronization signals between system 100 and graphics processing system 155. an example of such a dedicated interface is described in the U.S. patent application titled "CONNECTING GRAPHICS ADAPTERS FOR SCALABLE PERFORMANCE," Philip B. Johnson, filed Nov. 17, 2004, and assigned to the assignee of the present invention. A GPU configured as a master graphics device, such as host GUP 115, outputs image data directly to a display device, such as host display 170. In contrast, a GPU configured as a slave graphics device outputs pixel data to a master graphics device, sometimes through another slave graphics device. The digital pixel data may be transferred from a slave graphics device, e.g. GPU 125, to the master graphics device, e.g., host GPU 115, or to another slave graphics device using a number of single bit connections for data, a data valid signal, and a clock. The digital pixel data and data valid may be transferred on one or both edges of the clock.

When host GPU 115 is configured as a master graphics device, it generates the synchronization signals, specifically a horizontal sync, a vertical sync, data enable, blanking periods, and the like, using techniques known to those skilled in the art. The synchronization signals are output to host display 170 and to graphics processing system 155 via connection 122. A buffer management signal used to control the output of the digital pixel data may be included in the dedicated interface. In some embodiments of the present invention, a buffer management signal indicates when all of the GPUs producing pixel data for a display should swap buffers, i.e., swap the back buffer with the front buffer.

Transfers over connection 121 and between switch 140 and each GPU 125 may be performed using an industry standard protocol such as PCI-Express™. In such cases, each of switch 140, chipset 130, and GPUs 125, would include an interface unit corresponding to the relevant industry standard protocol. Likewise, transfers between chipset 130 and host GPU 115 may be performed using an industry standard protocol, and host GPU 115 would include an interface unit corresponding to the relevant industry standard protocol.

A graphics driver 105, stored within main memory 110, configures host GPU 115 and GPUs 125 as needed to distribute a processing workload. Graphics driver 105 also may configure switch 140 as needed to access GPUs 125 and frame buffers 145. Graphics driver 105 communicates between applications executed by host processor 120 and graphics devices, host GPU 115 and GPUs 125, within graphics processing system 155. In some embodiments of the present invention, graphics driver 105 includes a device driver for host GPU 115 and a device driver for GPUs 125. Importantly, graphics driver 105 may load balance graphics processing between host GPU 115 and GPUs 125. For example, GPUs 125 may process a larger portion of an image than host GPU 115. In one embodiment, GPUs 125 process the entire image and host GPU 115 receives the image data from the first GPU 125 via connection 122. In alternative embodiments, host processor 120 controls the transfer of the image data from GPUs 125 to host GPU 115. In such cases, the image data passes through switch 140 and chipset 130 to reach host GPU 115.

Figure 1B:
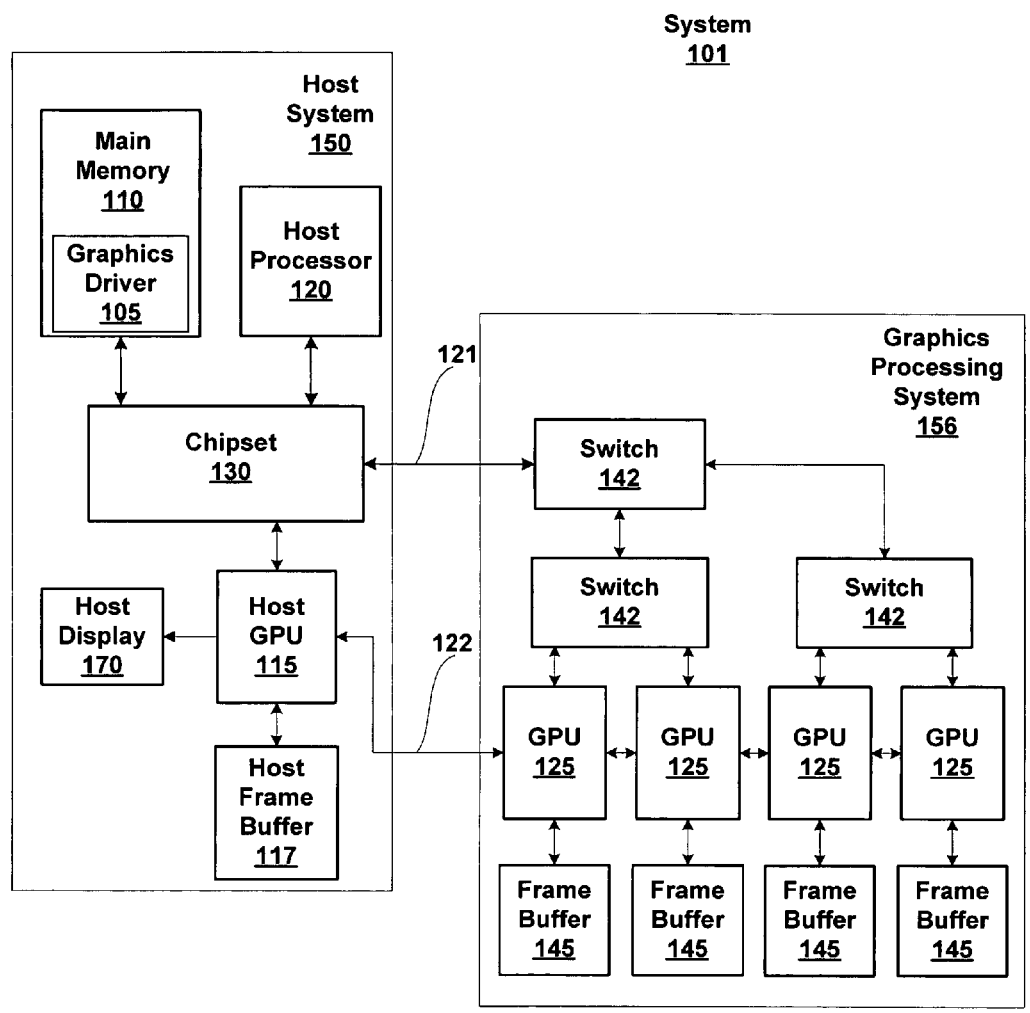
FIG. 1B is a block diagram of another scalable graphics processing system in accordance with one or more aspects of the present invention.

FIG. 1B is a block diagram of another scalable graphics processing system, system 101, in accordance with one or more aspects of the present invention. System 101 includes host system 150 of FIG. 1A and graphics processing system 156. Graphics processing system 156 differs from graphics processing system 155 in that switch 140 is replaced with switches 142. Switches 142 are configured in a tree structure to provide a port for each GPU 125. Each switch 142 may include an interface unit corresponding to the industry standard protocol. Additional switches 142 may be included within graphics processing system 156 as needed to interface with additional GPUs 125.

One advantage of systems 100 and 101 set forth in FIGS. 1A and 1B is that graphics data, such as texture maps, written to host frame buffer 117 and frame buffers 145 by host processor 120 may be broadcast to each GPU 125 by switch 140 or switches 142, rather than being separately written to each frame buffer 145. When the broadcast feature is used, the bandwidth consumed to transfer data to frame buffers 145 may be reduced based on the number of frame buffers 145 in graphics processing system 155 or 156. For example, the broadcast bandwidth associated with systems 100 and 101 is 1/Nth the bandwidth needed to transfer data separately to N frame buffers 145. Reducing the bandwidth between host processor 120 and each of GPUs 125 may improve system performance as well as graphics processing performance.

Figure 1C:
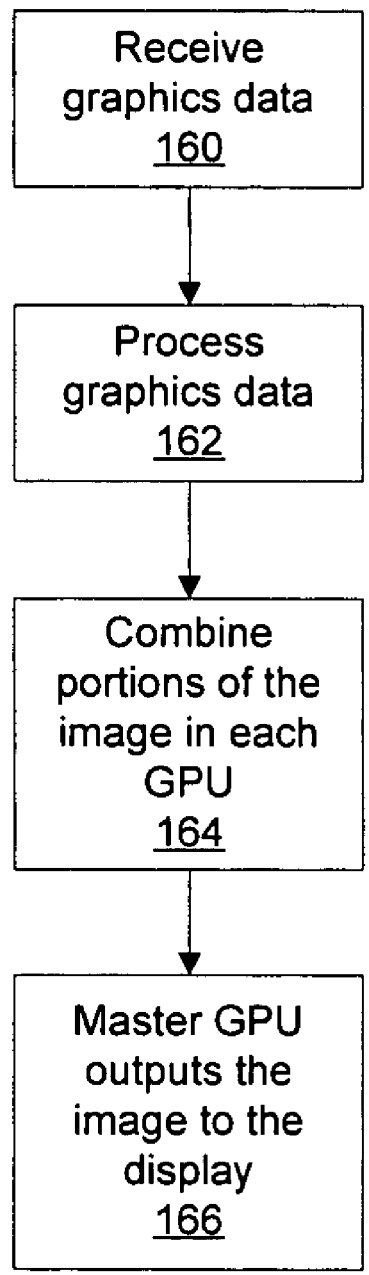
FIG. 1C illustrates an embodiment of a method of scaling graphics processing performance to produce an image in accordance with one or more aspects of the present invention.

FIG. 1C illustrates an embodiment of a method of scaling graphics processing performance to produce an image in accordance with one or more aspects of the present invention. In step 160, host GPU 115 and GPUs 125 receive graphics data, e.g., configuration information, graphics program instructions, texture data, or the like, from host processor 120. Host GPU 115 receives the graphics data from chipset 130, and GPUs 125 receive the graphics data from switch 140 in graphics processing system 155 or switches 142 in graphics processing system 156.

In step 162 the graphics data is processed by one or more of the GPUs, host GPU 115 and GPUs 125, according to the graphics program instructions. As previously described, processing of the graphics data to produce an image may be distributed between the GPUs. Each particular GPU processes the graphics data needed to produce the portion of the image distributed to the particular GPU. In one embodiment of the present invention, each GPU may be programmed to process a pixel area that is a number of scanlines, either contiguous or alternating. In other embodiments, each GPU may be programmed to process a pixel area that is a specific rectangular region of the image. In addition, the pixel area defining the pixels a particular GPU processes may be fixed for the particular GPU. Further, each image within a sequence of images may be processed by two or more GPUs.

In some embodiments of the present invention, graphics data is processed using multi-sample filtering and compositing with any overlay surface, base surface, icon, cursor, or the like, to produce pixel data. Performing multi-sample filtering prior to outputting the pixel data reduces the quantity of data by the number of samples filtered to produce data for each pixel.

In step 164, portions of the image are successively combined to produce the image. Specifically, each GPU 125 programmed to produce a particular portion of the image outputs the particular portion based on the synchronization signals received from host GPU 115. When the synchronization signals indicate that the particular portion of the image should not be output, for example when a pixel position specified by the synchronization signals is not within the particular portion, each GPU 125 outputs pixel data received from another GPU 125. Each GPU 125 combines pixel data produced by itself with pixel data received from another GPU 125 to produce combined pixel data, except for a last GPU 125 which does not receive pixel data from another GPU 125. The combined pixel data output by each GPU 125 represents combined portions of the image. Eventually, the first GPU 125 outputs combined pixel data to host GPU 115 via connection 122.

In step 166, host GPU 115, configured as a master GPU, performs any further combining and outputs the image to host display 170. Host display 170 is a remote display relative to graphics processing system 155 or 156. Host GPU 115 may scale the combined pixel data for the display device and perform digital to analog conversion prior to outputting the image to host display 170. Because a single device, host GPU 115 performs the digital to analog conversion for host display 170, artifacts resulting from digital to analog converter (DAC) mismatches between different GPUs are not introduced into the image when it is displayed.

Figure 1D:
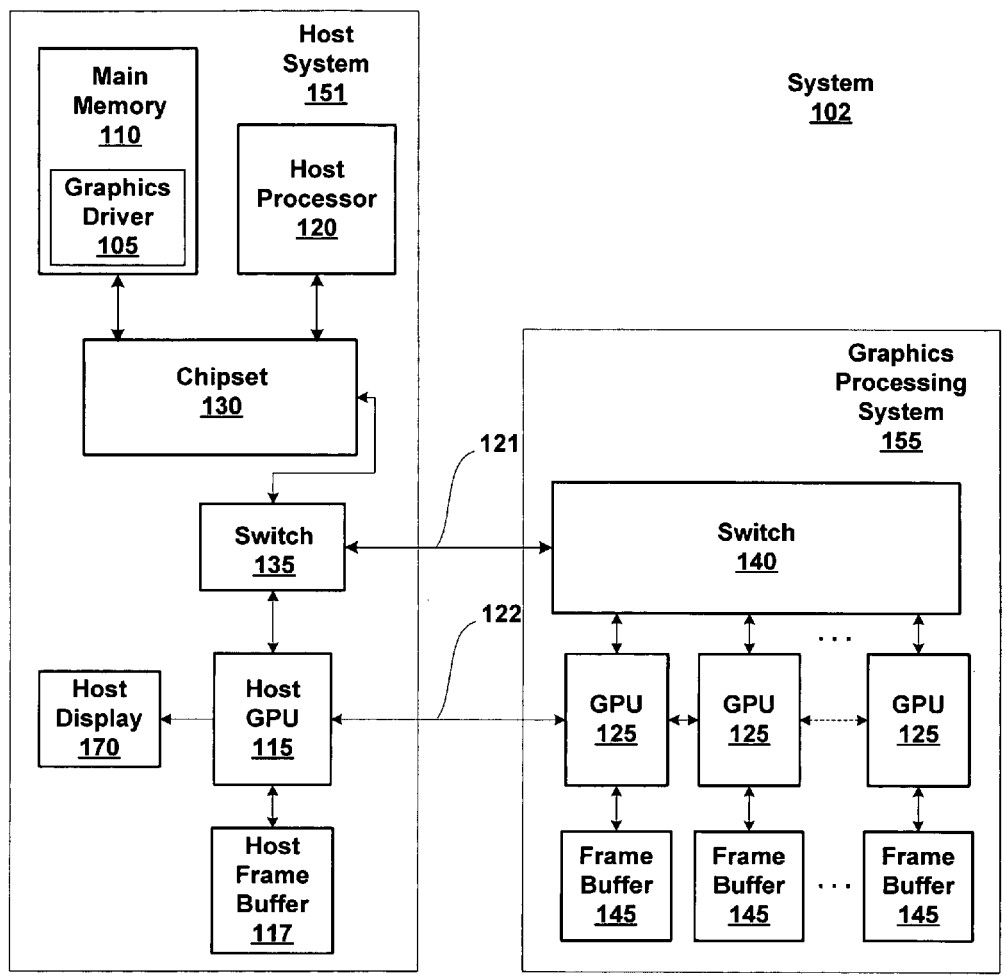
FIG. 1D is a block diagram of another scalable graphics processing system in accordance with one or more aspects of the present invention.

FIG. 1D is a block diagram of another scalable graphics processing system, system 102, in accordance with one or more aspects of the present invention. System 102 includes graphics processing system 155 of FIG. 1A and a host system 151. Host system 151 differs from host system 150 in that a switch 135 interfaces between chipset 130 and both host GPU 115 and graphics processing system 155. Like switch 140 or switches 142, switch 135 may be configured by graphics driver 105 to perform the broadcast feature. Therefore, graphics data written to host frame buffer 117 and frame buffers 145 by host processor 120 may be broadcast to host GPU 115 by switch 135 and each GPU 125 by switch 140 (or switches 142 if system 102 includes graphics processing system 156), rather than being separately written to host frame buffer 117 and each frame buffer 145.

In some embodiments of the present invention, Host GPU 115 is a low power device, particularly well-suited for portable devices that may rely on battery power. In contrast, GPUs 125 may be high performance graphics devices that consume more power than host GPU 115 and offer enhanced graphics performance, including image quality features and/or higher graphics processing throughput, e.g., frame rate, fill rate, or the like. Although systems 100, 101, and 102 are shown as multi-processor graphics processing systems, alternate embodiments of systems 100, 101, and 102 may process other types of data, such as audio data, multi-media data, or the like. In those alternate embodiments, host GPU 115 and GPUs 125 would be replaced with appropriate data processing devices. Likewise, graphics driver 105 would be replaced with one or more corresponding device drivers. Furthermore, in some embodiments of the present invention, host GPU 115 and/or switch 135 may be included within chipset 130.

Figure 2A:
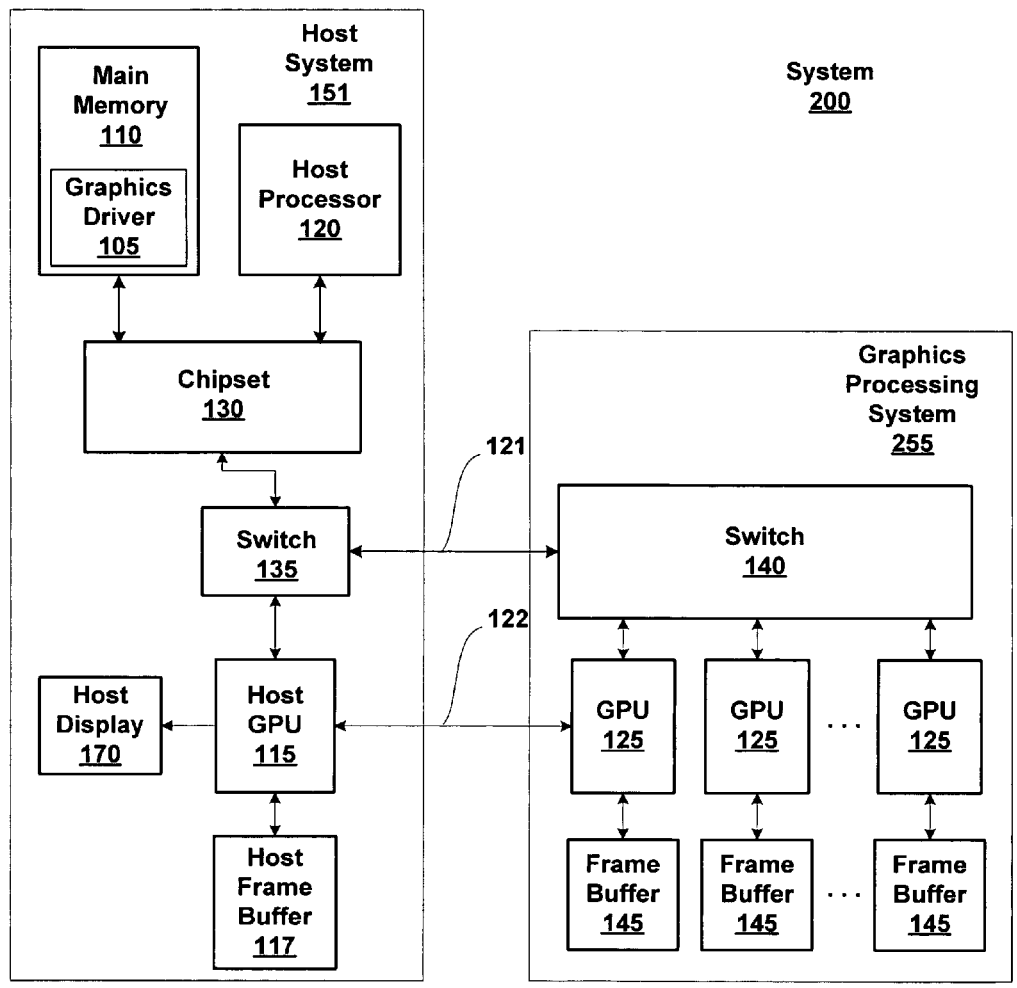
FIG. 2A is a block diagram of another scalable graphics processing system in accordance with one or more aspects of the present invention.

FIG. 2A is a block diagram of another scalable graphics processing system, system 200, in accordance with one or more aspects of the present invention. System 200 includes host system 151 shown in system 102 of FIG. 1D and a graphics processing system 255. Graphics processing system 255 includes the elements of graphics processing system 155 with the exception of the dedicated interface between each GPU 125. Like graphics processing system 156, switch 140 within graphics processing system 255 may be replaced with switches 142. System 200 may also perform the broadcast feature, as previously described, to efficiently write graphics data to host frame buffer 117 and frame buffers 145.

Since graphics processing system 255 does not include the dedicated interface between GPUs 125, each GPU 125 transfers pixel data to the first GPU 125 through switch 140. The transfer may be performed as a write from a first frame buffer 145 to the frame buffer 145 coupled to the first GPU 125. Alternatively, the first GPU 125 may read pixel data from the first frame buffer 145 and store the pixel data in its respective frame buffer 145. The first GPU 125 produces combined pixel data, which may be transferred to host GPU 115 via connection 122, as previously described. In some embodiments of the present invention, connection 122, directly coupling the first GPU 125 to host GPU 115, is omitted and pixel data may be transferred between the first GPU 125 and host GPU 115 via switch 140 and switch 135.

Figure 2B:
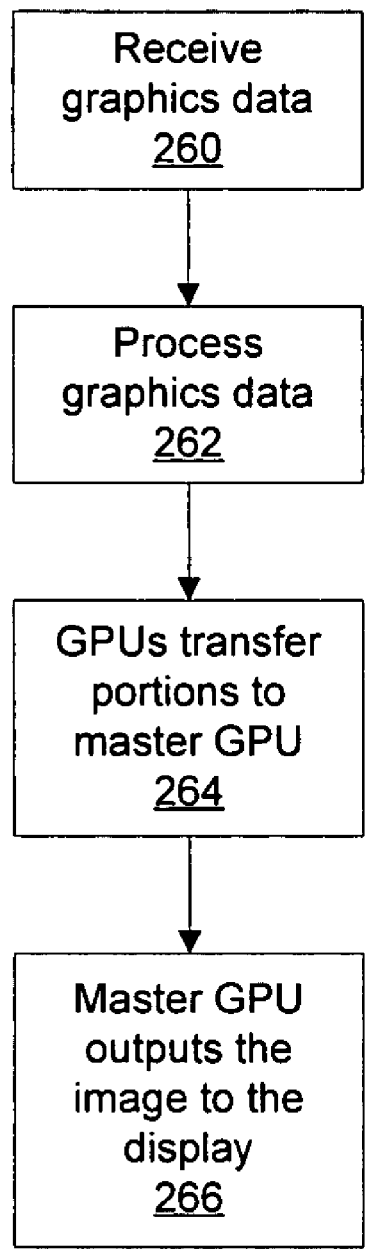
FIG. 2B illustrates an embodiment of another method of scaling graphics processing performance to produce an image in accordance with one or more aspects of the present invention.

FIG. 2B illustrates another embodiment of a method of scaling graphics processing performance to produce an image in accordance with one or more aspects of the present invention. In step 260, host GPU 115 and GPUs 125 receive graphics data, e.g., configuration information, graphics program instructions, texture data, or the like, from host processor 120, as previously described in conjunction with step 160 of FIG. 1C.

In step 262, the graphics data is processed by one or more of the GPUs, host GPU 115 and GPUs 125, according to the graphics program instructions, as previously described in conjunction with step 162 of FIG. 1C, to produce pixel data for portions of the image. In step 264, each GPU 125 transfers the portions of the image to the first GPU 125 which is configured as a local master GPU. The first GPU 125 combines the portions to produce combined portions of the image and outputs the combined portions of the image to host GPU 115 via connection 122. In other embodiments of the present invention that do not include connection 122, each GPU 125, including the first GPU 125, transfers the portions of the image to host GPU 115 via switch 140, connection 121, and switch 135.

In some embodiments of the present invention, the portions of the image produced by each GPU 125 are not filtered and therefore include data for each multi-sample within a pixel. In those embodiments, the amount of data transferred from each GPU 125 is increased by the number of multisamples, and either the first GPU 125 configured as a local master GPU or host GPU 115 performs the multi-sample filtering. In step 266, host GPU 115, configured as a master GPU, performs any further combining and outputs the image to host display 170, as previously described in conjunction with step 166 of FIG. 1C.

Figure 2C:
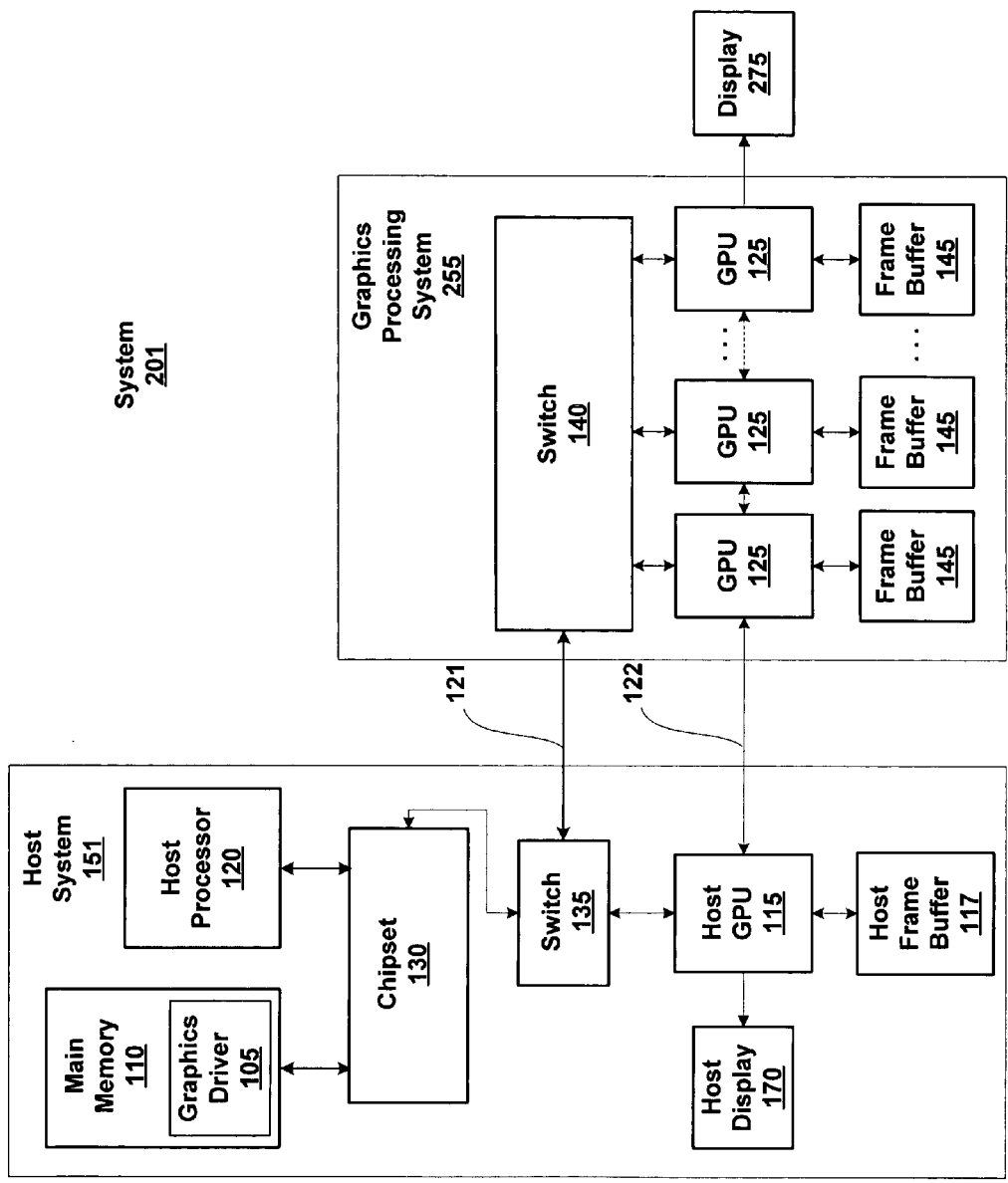
FIG. 2C is a block diagram of another scalable graphics processing system in accordance with one or more aspects of the present invention.

FIG. 2C is a block diagram of another scalable graphics processing system, system 201, in accordance with one or more aspects of the present invention. System 102 includes host system 151 of FIG. 1D and a graphics processing system 255. Graphics processing system 255 includes the elements of graphics processing system 155 and an output connector configured to couple to a display 275. Like host display 170, display 275 may include one or more display devices, such as a CRT, flat panel display, or the like. Although, in FIG. 2C, display 275 is directly coupled to the last GPU 125, display 275 may be directly coupled to any of the GPUs 125 within graphics processing system 255. Furthermore, additional displays 275 may be coupled to any GPU 125.

Although systems 200 and 201 are shown as scalable graphics processing systems, alternate embodiments of systems 200 and 201 may process other types of data, such as audio data, multi-media data, or the like. In those alternate embodiments, host GPU 115 and GPUs 125 would be replaced with appropriate data processing devices. Likewise, graphics driver 105 is replaced with one or more corresponding device drivers. Furthermore, in some embodiments of the present invention, host GPU 115 and/or switch 135 may be included within chipset 130.

Graphics processing performance of a host system with limited graphics processing performance may be increased by supplementing the processing capabilities of a host processor and host graphics processor with a separate graphics processing system without being limited by power constraints or particular system configuration constraints. Specifically, processing of an image may be distributed between the host graphics processor and the separate graphics processing system to leverage the host graphics processing and display resources.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A system for scalable graphics processing, comprising:
a host system including a host processor, a host display, and a host graphics processor coupled to the host display;
a graphics processing system including a first graphics processing device, a second graphics processing device, and a switch, wherein the switch is separately coupled to the first graphics processing device and the second graphics processing device and configurable to simultaneously broadcast graphics data to the first graphics processing device and the second graphics processing device;
a first connection configured to directly couple the host graphics processor to the first graphics processing device for the transmission of pixel data; and
a bridge device coupled between the host processor and the host graphics processor and coupled to the switch within the graphics processing system to provide a second connection for the transmission of graphics data to the first graphics processing device.

2. The system of claim 1, wherein the second graphics processing device is coupled to the first graphics processing device for transmitting pixel data from the second graphics processing device to the first graphics processing device.

3. The system of claim 2, wherein the first graphics processing device is configured to combine pixel data received from the second graphics processing device with pixel data processed by the first graphics processing device to produce combined pixel data.

4. The system of claim 2, further comprising a third graphics processing device included in the graphics processing system, wherein the second graphics processing device is configured to combine pixel data received from the third graphics processing device with graphics data processed by the second graphics processing device to produce combined pixel data and is further configured to transmit the combined pixel data to the first graphics processing device.

5. The system of claim 4, wherein the host graphics processor is configured to convert the combined pixel data for display on the host display.

6. The system of claim 1, wherein the host system is a portable computing device.

7. The system of claim 1, where in the first connection is configured to transmit synchronization signals generated by the host graphics processor for controlling the host display.

8. A method of processing graphics data for a host display, comprising:

receiving the graphics data and graphics program instructions through a first connection provided by a bridge device that is coupled to a switch, wherein the bridge device is coupled between a host processor and a host graphics processor and the switch is configurable to simultaneously broadcast the graphics data and graphics program instructions to each graphics processing device of a plurality of graphics processing devices;

processing the graphics data within the plurality of graphics processing devices, wherein each one of the plurality of graphics processing devices processes a portion of the graphics data to produce a portion of an image and each one of the plurality of graphics processing devices is coupled to the switch;

successively combining each portion of the image to produce combined portions of the image; and outputting the combined portions of the image to the host graphics processor coupled to the host display.

9. The method of claim 8, wherein the host graphics processor is configured to produce an additional portion of the image and to combine the combined portions of the image with the additional portion to produce the image.

10. The method of claim 8, further comprising the steps of:

scaling the combined portions of the image to produce the image for output to the host display; and displaying the image on the host display.

11. The method of claim 8, wherein each portion of the image is successively combined within a different one of the plurality of graphics processing devices to produce the combined portions of the image.

12. The method of claim 8, wherein each portion of the image is successively combined within one of the plurality of graphics processing devices that is configured as a local master graphics device to produce the combined portions of the image.

13. The method of claim 8, wherein the steps of combining and outputting are controlled using synchronization signals received from the host graphics processor.

14. The system of claim 1, wherein the graphics processing system is enclosed within a chassis that includes a power supply and one or more connectors for the first connection and the second connection.

15. The system of claim 1, wherein the pixel data transmitted from the second graphics processing system device to the first graphics processing device includes data for multi-samples within each pixel.

16. The system of claim 15, wherein the first graphics processing device performs multi-sample filtering to produce the combined pixel data.

17. The system of claim 1, further comprising a main memory that is coupled to the bridge and configured to store the graphics data to be processed.

18. The method of claim 8, wherein each portion of the image includes data for multi-samples for each pixel in the image.

19. The method of claim 18, wherein the step of successively combining each portion of the image includes performing multi-sample filtering to produce the combined portions of the image.

* * * * *